W. J. WALKER.
ATTACHMENT FOR HARVESTER HEADERS.
APPLICATION FILED JUNE 6, 1917.

1,268,302.

Patented June 4, 1918.
2 SHEETS—SHEET 1.

Inventor
W. J. WALKER
By Watson E. Coleman
Attorney

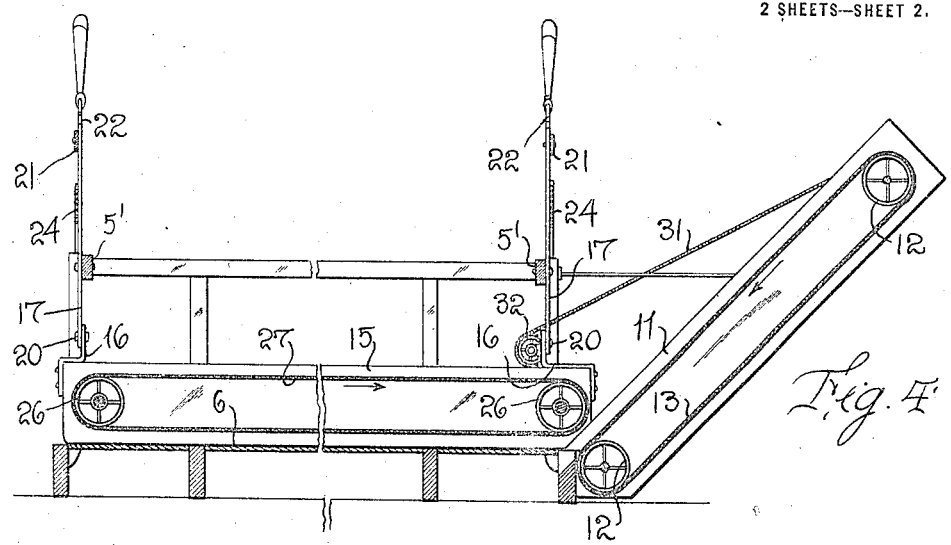
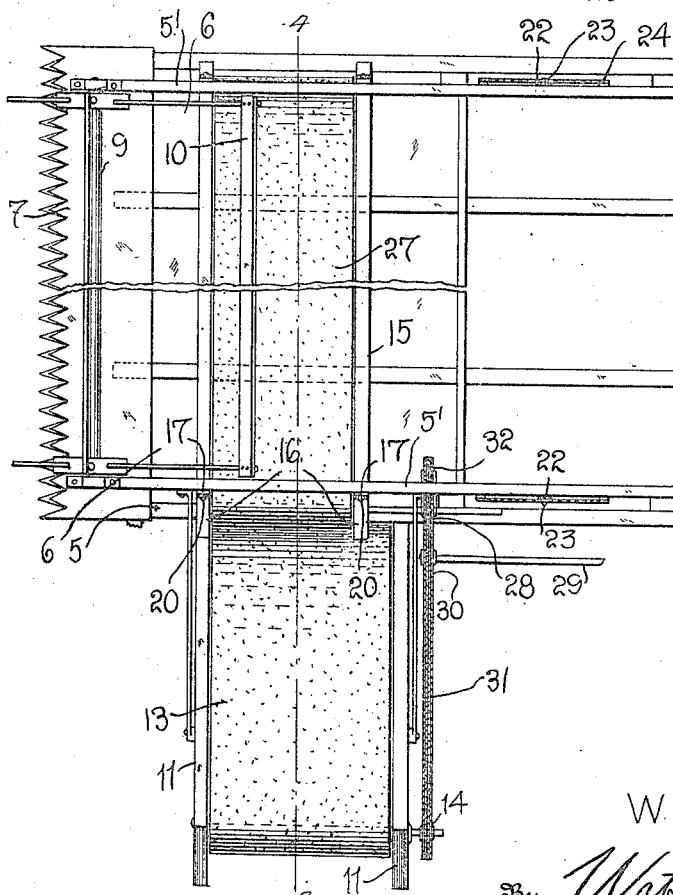

UNITED STATES PATENT OFFICE.

WILLIAM J. WALKER, OF LACROSSE, WASHINGTON.

ATTACHMENT FOR HARVESTER-HEADERS.

1,268,302.      Specification of Letters Patent.      Patented June 4, 1918.

Application filed June 6, 1917. Serial No. 173,191.

*To all whom it may concern:*

Be it known that I, WILLIAM J. WALKER, a citizen of the United States, residing at Lacrosse, in the county of Whitman and State of Washington, have invented certain new and useful Improvements in Attachments for Harvester-Headers, of which the following is a specification, reference being had to the accompanying drawings.

This invention relates to an improved attachment for harvester headers, and has for its primary object to provide improved means for gathering the straw and weeds and delivering the same to a thresher.

It is another and more particular object of the invention to provide a lower inclined apron upon the header frame and at one side thereof, a second apron arranged rearwardly of the reel above the grain receiving platform, means for adjusting said latter apron with respect to the reel, and means for moving the aprons in relatively opposite directions to discharge the grain straw and weeds at a common point.

It is also an additional object of my invention to provide a grain header attachment as above characterized, which may be readily applied to the ordinary harvester machine at but slight additional cost, and is highly convenient and serviceable in practical use.

With the above and other objects in view, my invention consists in the novel features of construction, combination, and arrangement of parts to be hereinafter more fully described, claimed, and illustrated in the accompanying drawing, in which, Figure 1 is a side elevation, the lower inclined apron supporting frame being in section;

Fig. 2 is a top plan view;

Fig. 4 is a section taken on the line 4—4 of Fig. 2.

Figure 1:
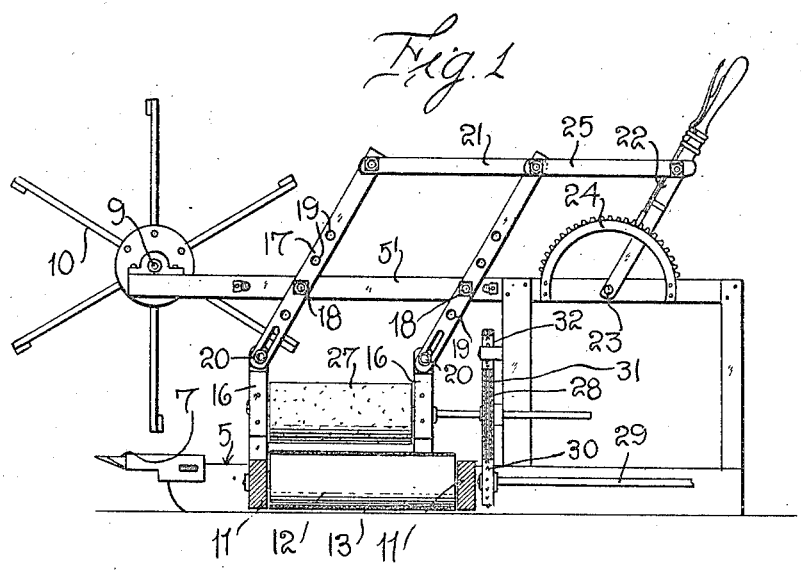
Figure 3:
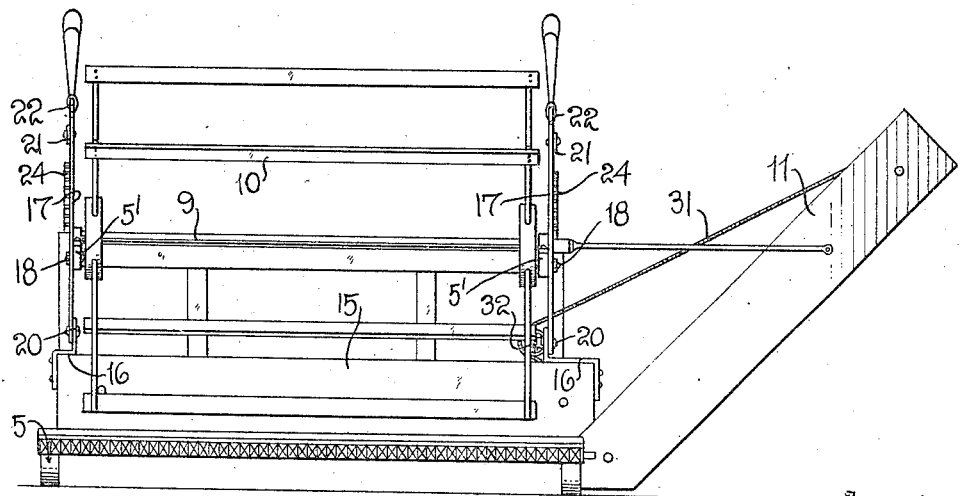
Fig. 3 is a front end elevation.

Referring in detail to the drawing, 5 designates the header frame which is provided with a grain receiving platform 6 and the usual finger bar indicated at 7. In suitable bearings 8 on this frame, the shaft 9 of a reel 10 is rotatably mounted.

At one end of the platform 6, a transversely disposed, upwardly inclined frame 11 is mounted, and in this frame the upper and lower apron rollers 12 are arranged. A flexible apron or conveyer 13 extends around these rollers. The other roller is provided upon one end with a sprocket indicated at 14.

A rectangular frame 15 is arranged above the platform 6 and in parallel relation thereto, and to the side bars of this frame, at their opposite ends, the upwardly projecting bracket members 16 are rigidly secured.

Upon the side bars 5' of the header frame 5, the spaced levers 17 are fulcrumed upon the bolts 18 fixed in said frame bars, each of the levers having a plurality of openings 19 therein, whereby they may be adjusted with respect to the frame. The lower ends of these levers are pivotally connected by means of the bolts 20 to the upper ends of the brackets 16. Thus, the frame 15 may be supported at any desired distance above the platform 6. The upper ends of the levers 17 are connected by a link 21. An adjusting lever 22 is also pivotally mounted, as at 23, upon each of the frame bars 5' and carries the usual spring-pressed dog for engagement with the teeth of a rack 24. This lever is connected by means of the bar 25 to the upper end of one of the levers 17. It will be readily understood from this construction that by proper adjustment of the levers 22, the frame 15 may be longitudinally adjusted toward or from the reel 10.

In the opposite ends of the frame 15, the rollers 26 are mounted, upon which the endless apron 27 is engaged. The apron roller which is adjacent to the lower roller of the inclined apron 13 is provided upon one end with the sprocket wheel 28.

29 designates the operating shaft provided with a sprocket wheel 30 engaging an endless chain 31. This chain extends upwardly from the sprocket wheel 30 over the sprocket 29 and then around an idler sprocket 32 mounted upon the header frame. From this latter sprocket, the chain extends to the sprocket wheel 14. It will thus be apparent that in the operation of the device, the aprons 13 and 27 are moved in relatively opposite directions so that the bottom stretch of the apron 27 moves in the same direction as the top stretch of the apron 13. It will be understood that the cut straw and weeds are delivered upon the apron 27 which moves in the direction indicated by the arrow, to deliver the grain and straw immediately above the lower end of the inclined apron 13. This latter apron moves in the direction indicated by the arrow in Fig. 4, and the grain and weeds falling upon the upper stretch thereof are likewise delivered at the lower end of said apron. The grain and weeds are discharged by the aprons either upon the ground or into a suitable trough from which they are conveyed to the thresher (not shown).

From the foregoing description, taken in connection with the accompanying drawing, the construction, manner of operation, and several advantages of my improved attachment for grain headers will be clearly and fully understood. The device can be readily applied to headers of the ordinary construction now commonly used in connection with grain harvesters, and is highly reliable and serviceable in practical use for the separation of the weeds and straw from the grain. As but relatively few parts are employed in the construction of the device, the same is not liable to get out of order but is very strong and durable. The aprons 13 and 27 may be of any approved form and construction and the several parts above referred to are also susceptible of considerable modification. It will, therefore, be understood that I reserve the privilege of adopting all such legitimate changes as may be fairly embodied within the spirit and scope of the invention as claimed.

Having thus fully described my invention, what I desire to claim and secure by Letters Patent is:

1. The combination with a header frame having a grain receiving platform and a reel mounted upon said frame, of an apron mounted at one side of the header frame, a second apron disposed above the platform, a pair of levers fulcrumed intermediate of their ends upon each side of the header frame and pivotally connected to the relatively opposite ends of the frame for the latter apron, means for adjusting said levers vertically upon the header frame, manually operable means connected to each pair of levers to position the latter apron with respect to the reel, and means for moving said aprons in relatively opposite directions to discharge the straw and weeds at a common point.

2. The combination with a header frame having a platform and a reel mounted upon said frame, of an endless apron mounted at one side of the frame, an apron frame disposed above said platform, spaced levers fulcrumed upon each side of the header frame and pivotally connected at their lower ends to the respective ends of said apron frame, means for vertically adjusting said levers to raise or lower the apron frame, links connecting the spaced levers to each other, manually operable means for each pair of levers, whereby the apron frame may be adjustably positioned with respect to the reel, a vertically inclined apron arranged at one end of said first named apron and means for moving the aprons in relatively opposite directions to discharge the straw and weeds from the machine at a common point.

In testimony whereof I hereunto affix my signature in the presence of two witnesses.

WILLIAM J. WALKER.

Witnesses:
B. J. ZERBA,
BENSON WRIGHT.

Copies of this patent may be obtained for five cents each, by addressing the "Commissioner of Patents, Washington, D. C."